(12) United States Patent
Hoffman et al.

(10) Patent No.: US 8,172,107 B2
(45) Date of Patent: May 8, 2012

(54) PERMEABLE NON-STICK COOKING SURFACE

(75) Inventors: Steve Hoffman, Mahwah, NJ (US); Robert E. Cannuscio, West Chester, PA (US)

(73) Assignee: Steve Hoffman, Mahwah, NJ (US)

( * ) Notice: Subject to any disclaimer, the term of this patent is extended or adjusted under 35 U.S.C. 154(b) by 1099 days.

(21) Appl. No.: 12/074,449

(22) Filed: Mar. 3, 2008

(65) Prior Publication Data

US 2008/0210693 A1 Sep. 4, 2008

Related U.S. Application Data

(60) Provisional application No. 60/904,316, filed on Mar. 1, 2007.

(51) Int. Cl.
*A47J 27/00* (2006.01)
*A47J 36/02* (2006.01)
*A47J 37/10* (2006.01)

(52) U.S. Cl. .......... 220/573.2; 219/433; 99/399; 99/422

(58) Field of Classification Search .................. None
See application file for complete search history.

(56) References Cited

U.S. PATENT DOCUMENTS

| | | | | |
|---|---|---|---|---|
| 2,939,606 | A * | 6/1960 | Durbin | 220/573.1 |
| 3,735,749 | A * | 5/1973 | Binks et al. | 126/20 |
| 3,794,016 | A * | 2/1974 | Binks et al. | 126/369 |
| 4,291,617 | A * | 9/1981 | Miller et al. | 99/483 |
| 4,452,132 | A * | 6/1984 | Miller et al. | 99/483 |
| 4,619,053 | A * | 10/1986 | Schumacher | 34/380 |
| 6,630,648 | B2 * | 10/2003 | Gruenwald | 219/385 |
| 7,222,563 | B2 * | 5/2007 | Reckert et al. | 99/330 |
| 2003/0024922 | A1 * | 2/2003 | Stanger et al. | 219/449.1 |

* cited by examiner

*Primary Examiner* — Joseph M Pelham
(74) *Attorney, Agent, or Firm* — Drinker Biddle & Reath LLP

(57) ABSTRACT

A cooking device including a permeable cooking layer having an outer cooking side and an inner side on the opposite surface from the outer side. A plurality of apertures are formed through the cooking layer from the inner side to the outer side. A heating layer is located adjacent to the inner side of the cooking layer. A plurality of passages are formed between the heating layer and the cooking layer so as to channel a non-stick fluid beneath the cooking layer. A non-stick fluid reservoir is in fluid communication with the passages. The reservoir adapted to store a non-stick fluid. In one embodiment, the non-stick fluid is a liquid hydrogen.

8 Claims, 4 Drawing Sheets

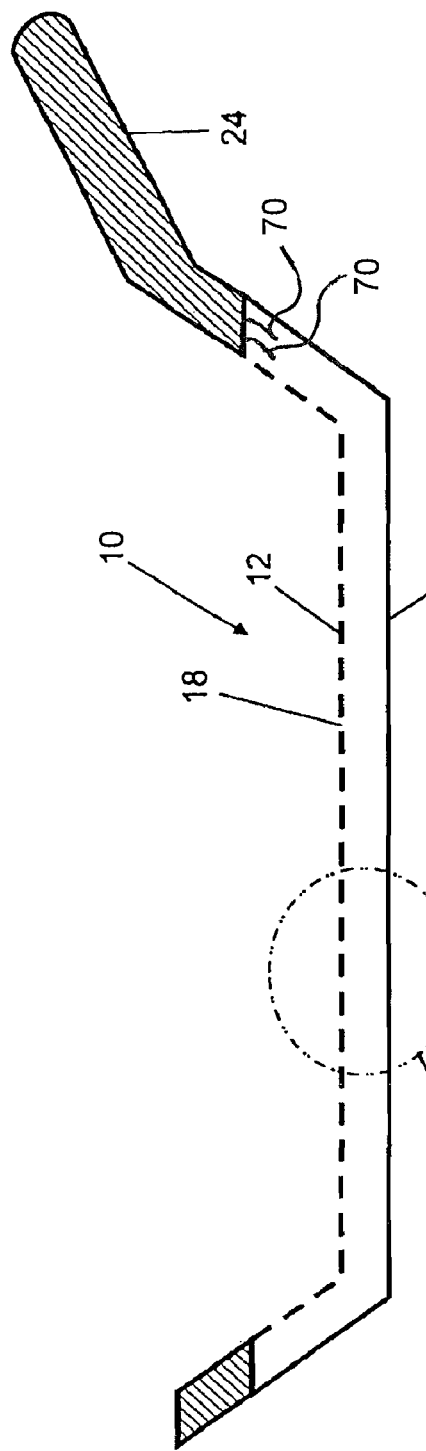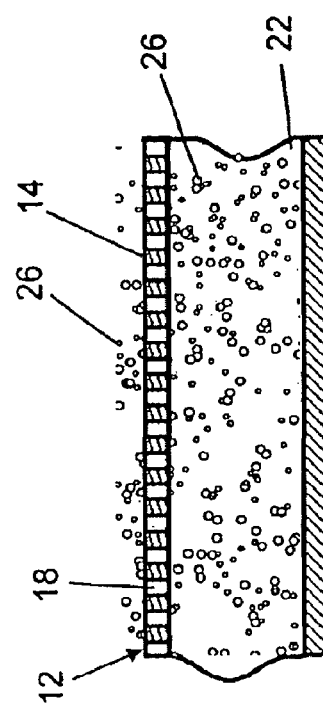

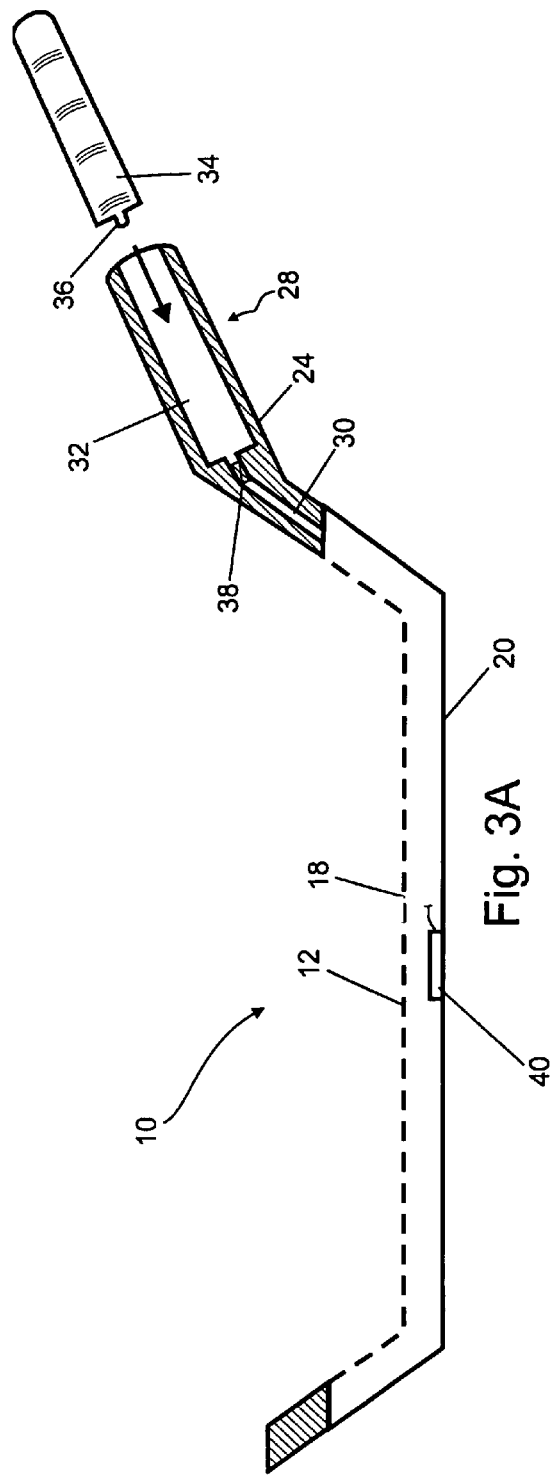
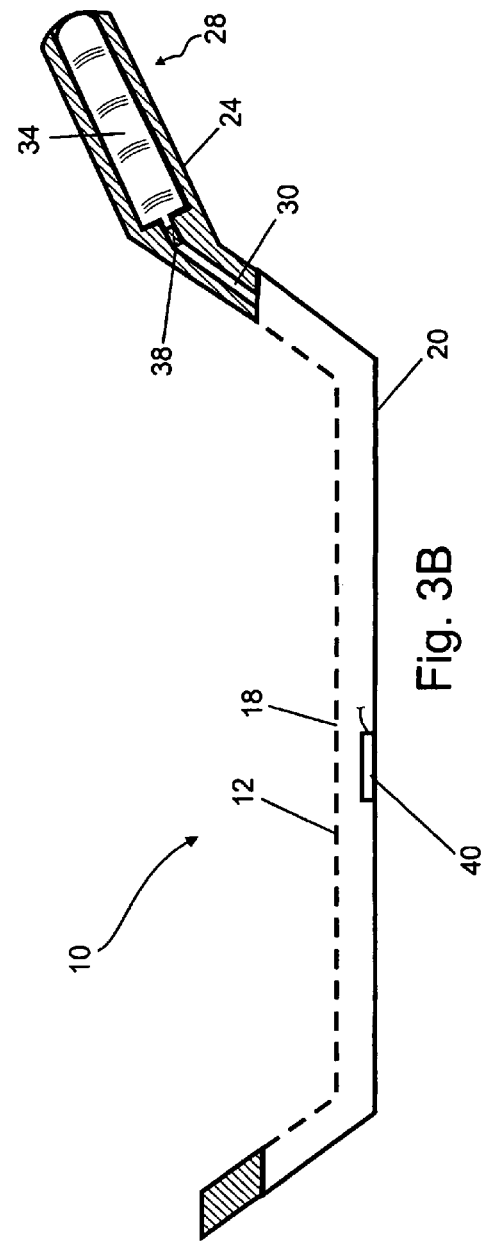

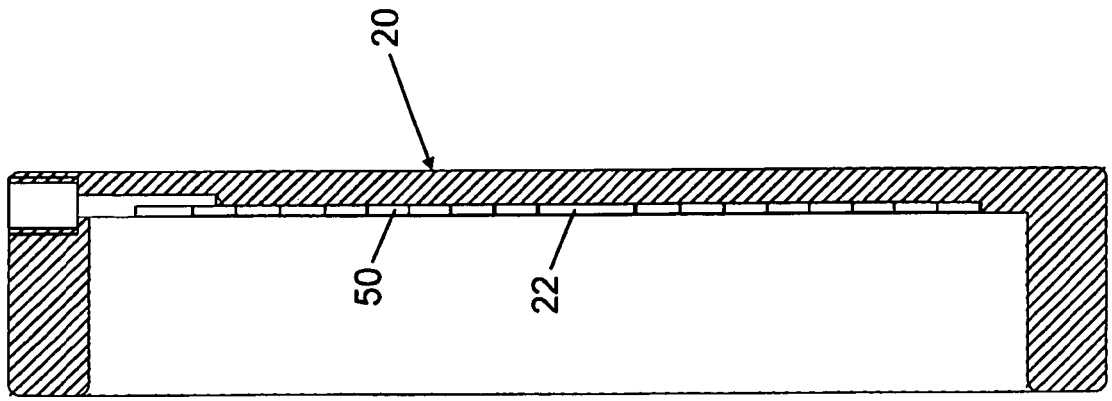
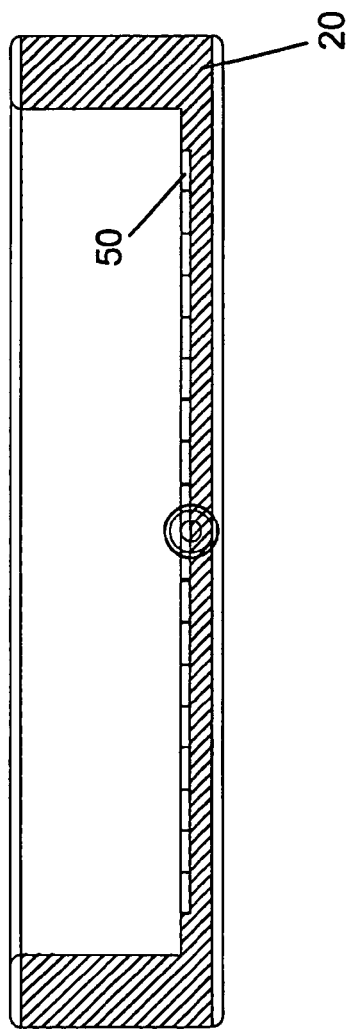
Fig. 6
Fig. 7

PERMEABLE NON-STICK COOKING SURFACE

RELATED APPLICATION

This application is related to and claims priority from U.S. Provisional Application No. 60/904,316, filed Mar. 1, 2007, the disclosure of which is incorporated herein in its entirety.

FIELD OF THE INVENTION

The present invention relates to a cooking surface and, more particularly, to a cooking surface that includes two layers, one of which is permeable to a fluid medium.

BACKGROUND

One of the primary annoyances with cooking is the cleaning of the cooking articles. As food cooks it has a tendency to adhere to the cooking surface. The reason for this is that the surface itself is not smooth on a microscopic level. Hence, the heating of the food causes food particles to bake onto the rough areas on the cooking surface.

To prevent food from adhering, a layer of liquid is generally added during the cooking process. This liquid is usually an oil, lard, or butter which has low friction and not prone to sticking to the cooking surface.

However, cooking fats, oils, and butter begin to scorch and smoke at about 392° F. (200° C.), and also begin to evaporate during the cooking process or absorb into the food. Since meat is usually cooked at temperatures between 400-450° F. (200-230° C.), the result is that the fats or oils eventually evaporate leaving the food once again in direct contact with the cooking surface. As such, even when cooking fats and oils are used, the food eventually sticks to the cooking surface.

Another drawback of cooking oil and grease is that they do not prevent sticking unless they are heated. Oil naturally has impurities, such as water. The applicant has determined that, when heated, the water in the oil rises to the surface of the oil. This creates a barrier layer between the food and the oil. It is this barrier layer of water that prevents the sticking to the pan. Many cook books describe the heating of the oil until it shimmers. The shimmering is the barrier layer of water on top of the oil.

One of the biggest advances over the last several decades in food preparation has been the development of what has been called "non-stick" coatings. The most well known of these is polytetrafluoroethylene [PTFE] sold under the trademark Teflon® by the DuPont company. The vast majority of cooking surfaces are coated with Teflon or similar non-stick coatings. Teflon® material itself is chemically inert and non-toxic. At least one report states that Teflon begins to deteriorate after the temperature of cookware reaches about 460° F. (237° C.), and begins to significantly deteriorate when the temperature of the cookware reaches about 680° F. (350° C.). See, http://en.wikipedia.org/wiki/Teflon.

Teflon® material has a coefficient of friction of about 0.1 or less which is the lowest of any known solid material. Thus, Teflon® material provides a very efficient non-stick surface.

However, some recent reports have identified some health concerns with the use of PTFE material. See: http://en.wikipedia.org/wiki/Teflon. Teflon material also tends to be a relatively fragile material, thus requiring protective handling to prevent scratching. Furthermore, since the material can degrade at higher temperatures, there are heat constraints which might negatively effect cooking requirements. As such, there is a need to find a replacement technology for providing a non-stick cooking surface.

SUMMARY OF THE INVENTION

A cooking device is disclosed that includes a permeable cooking layer. The cooking layer has an outer cooking side and an inner side on the opposite surface from the outer side. A plurality of apertures are formed through the cooking layer from the inner side to the outer side.

A heating layer is located adjacent to the inner side of the cooking layer. A plurality of passages are formed between the heating layer and the cooking layer so as to channel a non-stick fluid beneath the cooking layer. In one embodiment, the passages are formed by the spacing of the cooking layer from the heating layer. In another embodiment, the passages are formed directly into the heating layer or the cooking layer.

A non-stick fluid reservoir is in fluid communication with the passages. The reservoir adapted to store a non-stick fluid. In one embodiment, the non-stick fluid is a liquid hydrogen.

In one embodiment, the reservoir is a separate compartment that is removably inserted into a handle of the cooking device.

The foregoing and other features of the invention and advantages of the present invention will become more apparent in light of the following detailed description of the preferred embodiments, as illustrated in the accompanying figures. As will be realized, the invention is capable of modifications in various respects, all without departing from the invention. Accordingly, the drawings and the description are to be regarded as illustrative in nature, and not as restrictive.

BRIEF DESCRIPTION OF THE DRAWINGS

For the purpose of illustrating the invention, the drawings show a form of the invention that is presently preferred. However, it should be understood that this invention is not limited to the precise arrangements and instrumentalities shown in the drawings.

FIG. 1 is a schematic cross-sectional side view of a cooking device according to one embodiment of the invention.

FIG. 2 is an enlarged cross-sectional view of a portion of the cooking device in FIG. 1

FIG. 3A is a schematic cross-sectional side view of a cooking device illustrating one embodiment of a delivery system with a replaceable cartridge.

FIG. 3B is a schematic of the cooking device in FIG. 3A with the replaceable cartridge installed in a handle on the cooking device.

FIG. 6 is a cross-sectional side view of the cooking pan of FIG. 4 taken along lines 5-5 in FIG. 5.

FIG. 7 is a cross-sectional side view of the cooking pan of FIG. 4 taken along lines 6-6 in FIG. 5.

DESCRIPTION OF THE INVENTION

Figure 5:
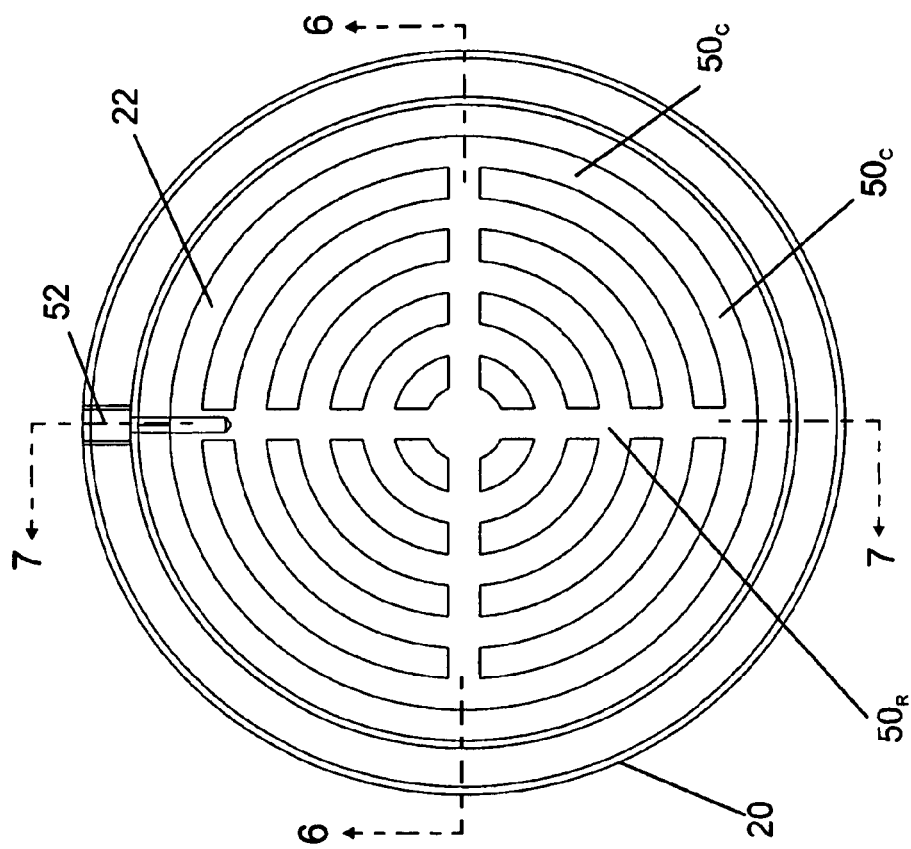
FIG. 5 is a top view of the cooking pan of FIG. 4.

The present invention is directed to a cooking device 10 that includes a permeable cooking surface or layer 12 with a cooking or outer side 14 and a non-cooking or inner side 16. The cooking layer 12 includes a plurality of apertures or holes 18 that extend from the inner side 16 to the outer side 14. Although FIGS. 1 and 2 illustrate the holes 18 as being straight, through the cooking layer 12, the invention contemplates any arrangement that permits fluid passage from the inner side 16 to the outer side 14. For example, the cooking layer 12 may be formed from a ceramic material with sufficient porosity. The cooking layer 12 may be thin permeable membrane, provided it possesses sufficient strength to withstand forces imposed during a normal cooking operation. Thus, the cooking layer 12 may be formed from any suitable metal, plastic, composite or ceramic material that can withstand the temperatures and the surface contacts, such as scraping with a cooking utensil, anticipated in a conventional cooking operation. In one embodiment, the cooking layer 12 is formed from stainless steel material.

The cooking device also includes a heating surface or layer 20. The heating surface 20 is located on the opposite side of the cooking layer 12 from the cooking side 14 (i.e., on the same side as the inner side 16 of the cooking layer 12) and is spaced apart from the inner side 16 of the cooking layer 12 so as to define one or more cavities or passages 22. The heating layer 20 is intended to be exposed to a heating source, such as a conventional gas flame or electric heater on a stove. The heating layer 20 is preferably substantially non-permeable so as to prevent the passage of fluid. The heating layer 20 may be formed from any conventional material used in cooking, such as metal, plastic, composite or ceramic material. The heating layer 20 may be made from the same or different material than the cooking layer 12. It is contemplated that the heating and cooking layers can be made from the same material and formed as a single piece with the passages 22 and holes 18 molded or otherwise formed into it. The passages of cavities preferably have a small height (i.e., small spacing between the inner side of the heating layer 20 and the inner side of the cooking layer 12.) It is contemplated that the height needs to only be sufficient to permit channeling of a non-stick fluid.

Also, in light of the nature of the preferred non-stick fluid being gaseous, it is possible that a sintered material can be used with randomly formed channels. As will be discussed below, the non-stick gaseous fluid can be supplied under pressure. As a result, the gaseous fluid would immediately spread until the gas reaches the holes or otherwise escapes. By selecting a porous material for the cooking layer that has some degree of resistivity to the direct passage of the gas, the pressurization of the gas combined with the resistance of eh permeable cooking layer would cause the gas to pass around any obstacles in the porous material, such as blockages, etc., seeking out the passage of least resistance. The result is a diffusion of the gas through the porous material and a fluidization of the gas as it passes out of the porous material.

As shown in FIG. 1, in one preferred embodiment, the cooking device 10 is in the form of a frying pan with a handle 24. However, the invention is not limited to that particular configuration, but can be applied to any suitable cooking device, such as baking sheets, pots, etc. Thus, the illustrated embodiment is simply intended to present one example of cooking device according to the present invention.

The holes 18 in the layer 12 are preferably of sufficient size so as to permit a non-stick fluid 26 to pass through from the cavity 22 through the holes 18 to the outer side 14. In one preferred embodiment, the non-stick fluid is a liquid hydrogen that is located in or channeled into the cavity 22. At standard temperature and pressure, hydrogen is colorless, odorless, nonmetallic and tasteless. It is a very light element and, as such, quickly expands into the air. Other non-stick fluids may be used in the present invention, such as inert gases, reactive gases, and pressurized steam. In one preferred embodiment, the hydrogen is preferably less than 1% and, more preferably, much less than ½% of the total amount of air interacting with the food.

It is also contemplated that the pan can have a mechanism for producing hydrogen or otherwise have the hydrogen stored inside the pan. For example, the hydrogen could be manufactured through any conventional electrolysis process. Alternately, known fuel cell technology can be used to generate the hydrogen. Such technology exists in the nail gun industry, such as PASLODE nail guns. In these devices, the fuel cell is non-reactive until used.

During use, the hydrogen or other non-stick material is channeled into the passages 22 and then passes through the holes to the outer side 14 of the cooking layer 12. If the non-stick material is lighter than air, such as hydrogen, it will pass through the holes without assistance. If, however, the material is not as light as air, a pressure source or other process for urging the non-stick material through the holes would be used. For example, a pressurized gas, such as air, could be used to force the liquid through the holes. Alternately, a layer of material (not shown) may be located in the passage that expands when heated so as to force the non-stick liquid through the holes. The material preferably expands at a threshold temperature that is at or below the desired temperature for cooking, but is higher than the anticipated ambient temperature, such as 150° F.

Referring to FIGS. 3A and 3B, an embodiment of the invention is shown that includes one version of a delivery system 28 for containing and delivering the non-stick liquid. In this embodiment, the handle 24 includes a conduit 30 which connects at one end to the passage(s) 22. The handle 24 also includes a compartment 32 which connects to the other end of the conduit 30. The compartment 32 is open an its other end and is designed to receive a non-stick liquid or gas container or chamber 34. The container 34 is preferably designed to store a sufficient amount of non-stick material so as to permit the cooking device to be used a multiple amount of times. The container 34 is preferably replaceable after all the liquid or gas in the container has been exhausted.

Alternatively, the storage chamber can be non-replaceable and formed in the handle. In this embodiment, the chamber would contain a sufficient amount of the non-stick liquid or gas to last for the anticipated life of the cooking device, e.g., 500 uses. When the liquid or gas is exhausted, the cooking device can be either discarded or taken to a location to be recharged.

In order to permit the user to determine the amount of non-stick fluid remaining in the chamber, the handle and the storage chamber may include a window (not shown) that permits a user to see inside the chamber.

A valve or closure is formed in a port 36 on the storage container 34. The valve prevents dispensing of the non-stick liquid or gas until the container 34 is inserted into the compartment 32. The valve may be a one-way check valve, a slit valve or a severable cover. A pin, rod, or other device would be formed in the handle and oriented so as to puncture, or displace the valve in the container 34 when the container is inserted into the compartment, thereby permitting release of the fluid into the pan. Those skilled in the art would be capable of selecting a suitable valve in light of the discussion provided herein.

A second valve 38 is located with the conduit 30 and prevents the non-stick liquid from flowing into the passages until desired. The second valve 38 may be controlled by the user, such as with a trigger or button. More preferably, the second valve 38 is automatically controlled by a temperature sensor 40 mounted within the cooking device 10 and preferably on the heating layer 20 or the cooking layer 12. When the sensor 40 detects a temperature above a threshold a signal is sent to open the second valve 38. It is also contemplated that the heat of the heating surface can be used to open the valve 38, in which case the valve may be controlled by a thermocouple device.

The second valve 38 and port 36 are preferably controlled and or configured so as to meter out only the amount of non-stick fluid that is necessary to achieve cooking. An additional sensor can be located on the inner side of the cooking layer 12 to detect when liquid or gas is no longer passing through the holes. In this latter case, the second valve 38 is connected to the additional sensor so that the second valve can be opened and closed as needed.

Unlike prior art non-stick pans, the present invention provides a system which does not have temperature constraints or a surface that is fragile and, thus, susceptible to damage. It is also contemplated that the pan can be designed such that the porous surface (cooking layer) can be replaced. In this embodiment, locks or similar restraints are attached to the pan and configured to secure the porous surface 12 to the pan 10 above the heating layer 20 so as to form the passage 22.

Figure 4:
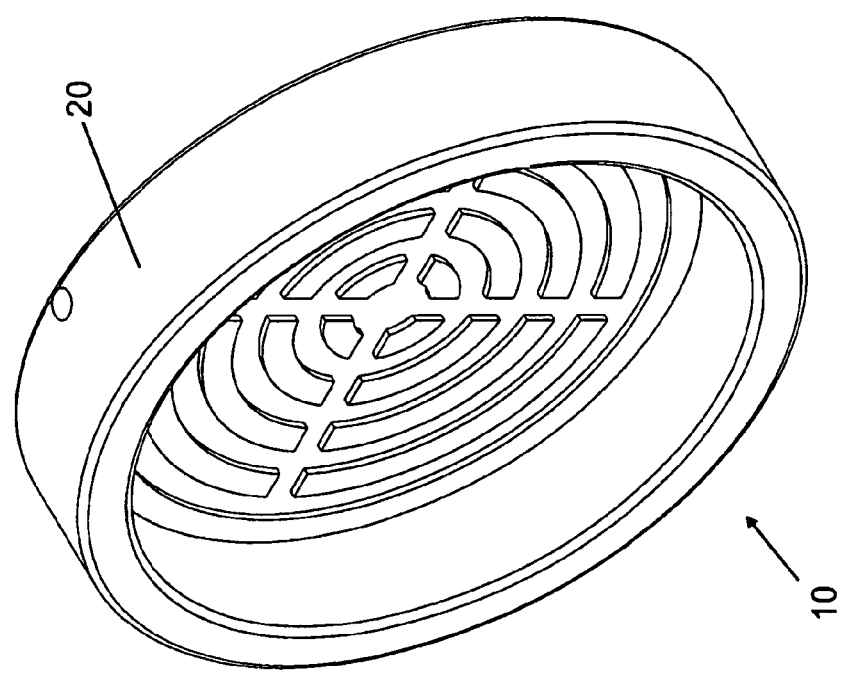
FIG. 4 is an isometric view of an alternate embodiment of a cooking pan according to the present invention with defined passages.

Referring to FIGS. 4-7, an alternate embodiment of the cooking device 10 is shown. In this embodiment, the cooking device 10 includes a heating layer 20 that has channels 50 formed in it so as to define the passages 22. As shown, the channels 50 may be formed as a series of concentric circles $50_C$ interconnected by radial channels $50_R$. The channels 50 permit the non-stick fluid entering an inlet port 52 to distribute around the cooking device 10. Although the channels 50 are shown as being evening spaced and with a consistent width, it is also contemplated that the channels and passages may be formed with different shapes so as to provide control over the distribution of the non-stick fluid.

The cooking surface is not shown in FIGS. 4-7 but would be either fixedly secured to the cooking device 10 or could be removably secured, such as with clips, so as to permit easy cleaning of the cooking device. The cooking surface would be permeable as discussed above.

In one embodiment, the hydrogen is created either in the cavity or in a separate reservoir. In this embodiment, conductors 70 are spaced apart from each other such as by an insulator. A small amount of water is placed between the conductors 70. When current is applied, an electrical arc will form through the water generating hydrogen and oxygen from the water. Since hydrogen is lighter than oxygen, it will rise quicker and permeate through the cooking layer. The conductors 70 can be operate in a similar matter to a thermocouple using the Seebeck effect. Using this type of device, the temperature difference between two surfaces can be used to produced a small voltage at a juncture, which should be sufficient to produce the requisite amount of hydrogen. Similarly, Peltier elements or similar types of devices can be used.

It is contemplated that the atmospheric humidity that naturally exists on the surface of the cooking device may be sufficient to produce the desired amount of hydrogen to provide cooking, thus eliminating the need to include a water source.

It is also contemplated that the conductors discussed above could be formed in extremely small (e.g., microscopic in size) directly on the heating layer. In this embodiment, the hydrogen would be generated directly on the surface of the heating element and, thus, no separate cooking layer is needed since the top of the heating element would form the desired cooking layer.

It is also contemplated that cartridge may contain two or more gasses or fluids. For example, it may be desirable to provide a cartridge that includes a liquid hydrogen portion and a compressed inert gas portion, such as $CO_2$. When it is desirable to cook, the hydrogen is supplied as discussed above. After cooking is complete, in order to assist in any cleaning of the cooking surface, a burst of the compressed gas can be supplied to clean out any contaminants that may have entered the passage or the apertures. In this embodiment, a separate trigger may be provided to control each fluid. Alternately, one or more thermocouples can be used to control of the two fluids. For example, when the temperature is increasing—indicative of a cooking operation—the non-stick fluid is supplied. When the temperature is decreasing—indicative of a post cooking operation—the non-stick fluid supply is shut off and the compressed gas is metered into the pan.

In a further configuration of the present invention, the cooking surface may include multiple zones, which can be individually controlled. In this embodiment, one or more fluids may be supplied to the cooking surface, each preferably connected through a manifold system to allow of selective channeling of fluids to different zones. Hence, while a product is cooking on one zone, the non-stick fluid can be supplied to that zone, while the other zones may receive no non-stick fluid supply or a cleaning gas instead.

Furthermore, if may be desirable to supply other fluids or gases to enhance the cooking. For example, it may be preferable to use a particular non-stick fluid for meats and a different non-stick fluid for fish. It is contemplated that different canisters or reservoirs can be used to supply the desired non-stick fluid.

Also, it is known that ozone can be used to help eliminate certain smells, such as the smell of burnt food. Thus, it is contemplated that ozone may also be supplied to the cooking device through the use of the canister or a connected reservoir. It is also possible to use the conductor system discussed above to create ozone from oxygen. The conductor arrangement can be used to generate hydrogen and oxygen from water, the hydrogen being used to cook the food and the oxygen being processed further to form ozone and stored for subsequent use.

Although the invention has been described and illustrated with respect to the exemplary embodiments thereof, it should be understood by those skilled in the art that the foregoing and various other changes, omissions and additions may be made therein and thereto, without parting from the spirit and scope of the present invention.

The invention claimed is:

1. A cooking device comprising:
   a permeable cooking layer having an outer cooking side and an inner side on the opposite surface from the outer side, a plurality of apertures are formed through the cooking layer from the inner side to the outer side;
   a heating layer located adjacent to the inner side of the cooking layer;
   a plurality of passages are formed between the heating layer and the cooking layer and adapted to channel a non-stick fluid beneath the cooking layer to the apertures; and
   a non-stick fluid reservoir in fluid communication with the passages, the reservoir adapted to store a non-stick fluid;
   wherein the cooking device is a cooking pan or pot and wherein the cooking surface is the outer facing surface contained within the pan or pot.

2. A cooking device according to claim 1 wherein the permeable cooking layer is a porous surface and wherein the porosity of the surface creates the apertures through the cooking layer.

3. A cooking device according to claim 1 wherein the cooking layer is removable from the heating layer.

4. A cooking device comprising:
a permeable cooking layer having an outer cooking side and an inner side on the opposite surface from the outer side, a plurality of apertures are formed through the cooking layer from the inner side to the outer side;
a heating layer located adjacent to the inner side of the cooking layer;
a plurality of passages are formed between the heating layer and the cooking layer and adapted to channel a non-stick fluid beneath the cooking layer to the apertures; and
a non-stick fluid reservoir in fluid communication with the passages, the reservoir adapted to store a non-stick fluid;
wherein the non-stick fluid is liquid or gas hydrogen.

5. A cooking device according to claim 4 the cooking device further comprising at least two conductors in the non-stick fluid reservoir, the conductors adapted to generate an arc therebetween, and wherein the hydrogen is created by the arc between the conductors.

6. A cooking device comprising:
a permeable cooking layer having an outer cooking side and an inner side on the opposite surface from the outer side, a plurality of apertures are formed through the cooking layer from the inner side to the outer side;
a heating layer located adjacent to the inner side of the cooking layer;
a plurality of passages are formed between the heating layer and the cooking layer and adapted to channel a non-stick fluid beneath the cooking layer to the apertures; and
a non-stick fluid reservoir in fluid communication with the passages, the reservoir adapted to store a non-stick fluid;
wherein the reservoir is a container that is removably insertable into a handle formed on the cooking device, and wherein a valve is formed in the handle to control dispensing of the non-stick fluid from the reservoir.

7. A cooking device comprising:
a permeable cooking layer having an outer cooking side and an inner side on the opposite surface from the outer side, a plurality of apertures are formed through the cooking layer from the inner side to the outer side;
a heating layer located adjacent to the inner side of the cooking layer, a handle attached to the heating layer;
a plurality of passages are formed between the heating layer and the cooking layer and adapted to channel a non-stick fluid beneath the cooking layer to the apertures, the passages connected to a conduit in the handle;
a non-stick fluid reservoir located within the handle and in fluid communication with the conduit, the reservoir adapted to store a non-stick fluid;
a valve formed in the handle, the valve adapted to control passage of the non-stick fluid from the reservoir into the conduit.

8. A cooking device according to claim 7 wherein the cooking device is a cooking pan or pot and wherein the cooking surface is the outer facing surface contained within the pan or pot, and wherein the non-stick fluid is a hydrogen liquid stored in the reservoir, and wherein the cooking device further comprises a mechanism for controlling the valve in the handle to meter out the liquid hydrogen.

* * * * *